(12) United States Patent
Wang et al.

(10) Patent No.: US 8,598,808 B2
(45) Date of Patent: Dec. 3, 2013

(54) FLYBACK WITH SWITCHING FREQUENCY RESPONSIVE TO LOAD AND INPUT VOLTAGE

(75) Inventors: Shiju Wang, Irvine, CA (US); Mike Lewis, Orange, CA (US); Hwangsoo Choi, Fullerton, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 206 days.

(21) Appl. No.: 13/195,868

(22) Filed: Aug. 2, 2011

(65) Prior Publication Data
US 2012/0025735 A1  Feb. 2, 2012

Related U.S. Application Data

(60) Provisional application No. 61/369,830, filed on Aug. 2, 2010.

(51) Int. Cl.
*H05B 37/02* (2006.01)
*G05F 1/00* (2006.01)

(52) U.S. Cl.
USPC .......................................... 315/294; 315/291

(58) Field of Classification Search
USPC ......... 315/247–248, 291, 294, 309, 274, 312, 315/209 R; 363/21.01, 21.03, 21.08, 21.09
See application file for complete search history.

(56) References Cited

U.S. PATENT DOCUMENTS

| 2006/0158134 A1* | 7/2006 | Maxik ........................... 315/224 |
| 2007/0182338 A1* | 8/2007 | Shteynberg et al. ....... 315/200 R |
| 2008/0018261 A1* | 1/2008 | Kastner ........................ 315/192 |
| 2008/0136350 A1* | 6/2008 | Tripathi et al. ............... 315/294 |
| 2008/0278092 A1* | 11/2008 | Lys et al. ..................... 315/247 |

* cited by examiner

*Primary Examiner* — Minh D A
(74) *Attorney, Agent, or Firm* — Simon Kahn

(57) ABSTRACT

A power source constituted of: a power factor corrector controller; an electronically controlled switch responsive to the power factor corrector controller; a first inductor serially connected with the electronically controlled switch and arranged to pass a direct current there through when the electronically controlled switch is closed; a second inductor magnetically coupled to the first inductor and coupled to provide power to a load in a flyback arrangement; a third inductor magnetically coupled to the first inductor, a first end of the third inductor arranged to provide a representation of the voltage level of the direct current when the electronically controlled switch is closed, and to provide a representation of the voltage level of the power provided to the load when the electronically controlled switch is open; and an off time control circuit in communication with the power factor corrector controller and responsive to the third inductor representations.

23 Claims, 2 Drawing Sheets

FLYBACK WITH SWITCHING FREQUENCY RESPONSIVE TO LOAD AND INPUT VOLTAGE

CROSS-REFERENCE TO RELATED APPLICATION

This application claims priority from U.S. Provisional Patent Application 61/369,830 filed Aug. 2, 2010, entitled "FLYBACK WITH SWITCHING FREQUENCY RESPONSIVE TO LOAD AND INPUT VOLTAGE", the entire contents of which is incorporated herein by reference.

BACKGROUND OF THE INVENTION

The present invention relates to the field of power sources, and in particular to a flyback switching power source whose frequency is responsive to both load level and the input voltage level.

Solid state lighting, and in particular light emitting diodes (LEDs) are rapidly coming into wide use for lighting applications. LEDs with an overall high luminance are useful in a number of applications including backlighting for liquid crystal display (LCD) based monitors and televisions, collectively hereinafter referred to as a matrix display, as well as for general lighting applications.

In a large LCD matrix display, and in large solid state lighting applications, such as street lighting, typically the LEDs are supplied in a plurality of strings of serially connected LEDs, at least in part so that in the event of failure of one string at least some light is still output. The constituent LEDs of each LED string thus share a common current.

LEDs providing high luminance exhibit a range of forward voltage drops, denoted $V_f$, and their luminance is primarily a function of current. Brightness control of the LEDs may be performed by either pulse width modulation (PWM) or by amplitude modulation. In a PWM brightness control a fixed current is driven through the LED string, and the duty cycle of the fixed current is adjusted in order to control the LED string brightness. In amplitude modulation the amount of current through the LED string is varied directly, thus adjusting the brightness.

The advantage of LED lighting is primarily in its energy efficiency and long life, and as such care must be taken to ensure high efficiency for the power source, while ensuring a high overall power factor. A solid state lighting unit which may be used with any worldwide AC mains input voltage is advantageous, since only a single part need be produced irrespective of market. Thus, the power source is to be arranged to work over a broad range of input voltages. Similarly, the solid state lighting unit is to be arranged to provide high efficiency over a broad dimming range, which in the case of amplitude modulation results in a requirement for high efficiency over a broad range of load currents.

SUMMARY OF THE INVENTION

Accordingly, it is a principal object of the present invention to overcome at least some of the disadvantages of the prior art power source. This is provided in certain embodiments by a single stage flyback power source whose switching frequency is responsive to both the input voltage and the output load voltage. In particular, the off time of a power factor corrector controller of the flyback primary side is adjusted so that the off time is increased responsive to an increased input voltage, and decreased responsive to a decreased input voltage. The off time is additionally adjusted responsive to the output voltage, particularly the off time is increased responsive to a reduced output voltage and decreased responsive to an increased output voltage.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
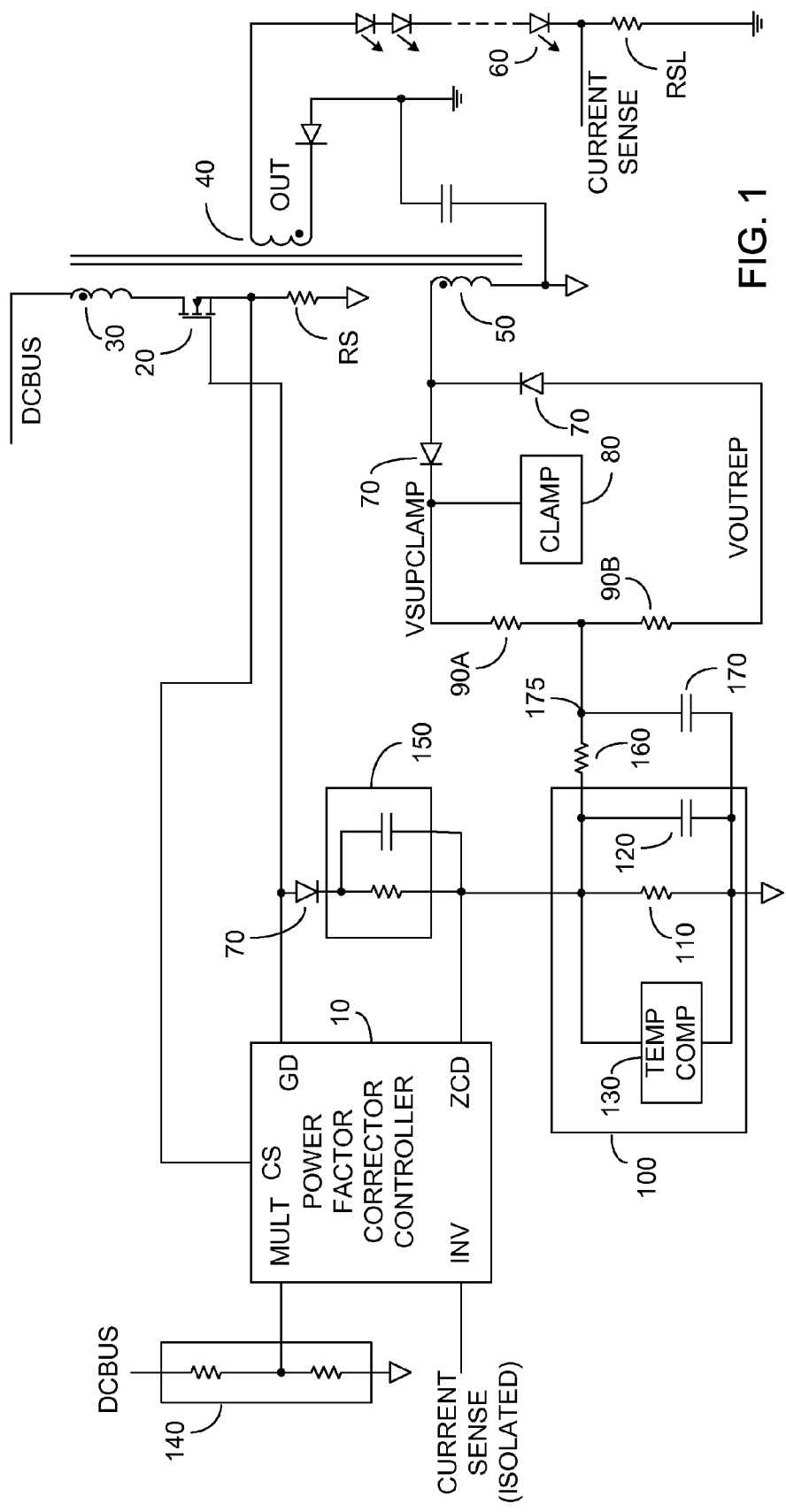
FIG. 1 illustrates a high level block diagram of an exemplary embodiment of a power source comprising a power factor corrector controller exhibiting an off-time responsive to both input voltage and output load.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

A flyback transformer controlled by a power factor corrector controller advantageously provides a good power factor and reasonable efficiency. While high efficiency is provided by a flyback transformer, particularly arranged in a fixed off time mode or with critical mode control, as the input voltage increases the switching frequency increases and the efficiency falls.

FIG. 1 illustrates a high level block diagram of an exemplary embodiment of a power source comprising a power factor corrector controller 10 exhibiting an off-time responsive to both input voltage and output load, the power source further comprising: an electronically controlled switch 20; a primary side sense resistor RS; a first inductor 30; a second inductor 40 magnetically coupled to first inductor 30; a third inductor 50 magnetically coupled to first inductor 30; an LED string 60; a load sense resistor RSL; a first, a second and a third unidirectional electronic valve 70, each depicted without limitation as a diode; a clamp circuit 80; a first add resistor 90A and a second add resistor 90B; a timing circuit 100 comprising a resistor 110, a capacitor 120 and a thermistor 130; a resistor divider network 140; a parallel connected RC filter 150; a linking resistor 160; and a linking capacitor 170. For ease of understanding the power source will be described in relation to a power factor corrector controller 10 constituted of an L6562 commercially available from ST Microelectronics, however this is not meant to be limiting in any way, and other power factor corrector controllers may be utilized without limitation. Electronically controlled switch 20 is illustrated as an NMOSFET without limitation.

A source of direct current, denoted DCBUS, which in an exemplary embodiment comprises a full wave rectified AC mains power, is connected to a first end of resistor divider network 140, and a second end of resistor divider network 140 is connected to a primary side common potential. The divided voltage of resistor divider network 140 is connected to the MULT input of power factor corrector controller 10 to provide the sinusoidal reference. DCBUS is further connected to a first end of first inductor 30, whose polarity is denoted with a dot, a second end of first inductor 30 is connected to a first end of electronically controlled switch 20, illustrated as the drain thereof, and the source of electronically controlled switch 20 is connected to a first end of primary side sense resistor RS and to the current sense input CS of power factor corrector controller 10. The second end of primary side sense resistor RS is connected to the primary side common potential.

Gate driver output GD of power factor corrector controller 10 is connected to the gate terminal of electronically controlled switch 20 and to the anode of third unidirectional electronic valve 70, and the cathode of third unidirectional electronic valve 70 is connected via parallel RC filter 150 to zero crossing detector input ZCD of power factor corrector controller 10, to a first end of each of resistor 110, capacitor 120 and thermistor 130 of timing circuit 100, and to a first end of linking resistor 160. A second end of each of resistor 110, capacitor 120 and thermistor 130 of timing circuit 100 are connected to the primary side common potential. The second end of linking resistor 160 is connected to a first end of each of first add resistor 90A and second add resistor 90B, and to a first end of linking capacitor 170, the node denoted 175. A second end of linking capacitor 170 is connected to the primary side common potential.

A first end of second inductor 40 is connected to the anode end of LED string 60, and the cathode end of LED string 60 is connected to a first end of load sense resistor RSL and to a CURRENT SENSE lead. The second end of load sense resistor RSL is connected to a secondary side common potential. The CURRENT SENSE lead is connected via an isolator to the inverting input of the error amplifier of power factor corrector controller 10, denoted INV. A second end of second inductor 40, whose polarity is denoted with a dot, is connected to the cathode of a free wheeling diode, and the anode of the free wheeling diode is connected to the secondary side common potential.

A first end of third inductor 50, whose polarity is denoted with a dot, is connected to the anode of first unidirectional electronic valve 70 and to the cathode of second unidirectional electronic valve 70. The cathode of first unidirectional electronic valve 70 is connected to clamp circuit 80 and to the second end of first add resistor 90A. The anode of second unidirectional electronic valve 70 is connected to a second end of second add resistor 90B, and a second end of third inductor 50 is connected to the primary side common potential. Preferably a capacitor is provided between the primary side common potential and the secondary side common potential.

In operation, power factor corrector controller 10 is arranged to close electronically controlled switch 20 thus providing a path for direct current from DCBUS to the primary side common potential, and direct current thus flows through first inductor 30 charging the flux thereof The current passing through first inductor 30 is detected by the voltage drop across primary side sense resistor RS, and passed to current sense input CS, which functions to compare the sensed current with an internal sinusoidal shaped reference, generated responsive to the divided voltage sensed at input MULT, and determine turn off for electronically controlled switch 20 so as to maintain a good power factor while ensuring that peak current is responsive to voltage feedback received at input INV. The closing of electronically controlled switch 20 further pulls up input ZCD via third unidirectional electronically controlled valve 70.

The voltage across first inductor 30 is reflected to third inductor 50, which thus presents the voltage DCBUS adjusted by the turns ration between first inductor 30 and third inductor 50 to the anode of first unidirectional electronic valve 70. The voltage across first inductor 30 is further reflected to second inductor 40, however no current flows due to the polarity of the free wheeling diode. The voltage appearing at the cathode of first unidirectional electronic valve 70 thus represents the value of the voltage of DCBUS, and is clamped by clamp circuit 80 to prevent excess compensation, and is denoted VSUPCLAMP.

When power factor corrector controller 10 opens electronically controlled switch 20, current from DCBUS ceases to flow through first inductor 30. The stored energy flies back through second inductor 40 driving LED string 60. Typically a capacitor is provided (not shown) across the load to filter the effect of the switching waveform and thus provide continuous current. The amount of current through LED string 60 generates a voltage drop across load sense resistor RSL, which is provided via an isolated path to power factor corrector controller 10 at input INV.

The voltage across second inductor 40 similarly appears across third inductor 50, in the reverse polarity and adjusted by the turns ratio between second inductor 40 and third inductor 50, and thus reflects the output voltage. The voltage appears at the anode of second unidirectional electronic valve 70, denoted VOUTREP, and is passed to ZCD via second add resistor 90B.

The off time of electronically controlled switch 20 is responsive to the voltage at input ZCD, which discharges through resistor 110 of timing circuit 100, and is held by capacitor 120 of timing circuit 100. When the voltage at input ZCD falls below a predetermined limit, power factor corrector circuit 10 again closes electronically controlled switch 20. The effective value of resistor 110 is adjusted by the value of thermistor 130, whose resistance decreases with increasing temperature, thus reducing the off time with increasing temperature.

Inherently, the on time of power factor corrector controller 10 decreases for a fixed load level as voltage of DCBUS increases. The efficiency of the power source declines as the frequency increases. Advantageously, as the voltage of DCBUS increases, the increased voltage is passed via first add resistor 90A to increase the off time, thus maintaining a near constant frequency, and in the event that the voltage of DCBUS decreases, the decreased voltage is passed via first add resistor 90A to decrease the off time, thus maintaining a near constant frequency. Similarly, as the output voltage level increases, the increased output voltage is reflected by third inductor 50 with reversed polarity, and is passed by second add resistor 90B to pull down the voltage appearing at ZCD thus decreasing the off time, thereby increasing the frequency, and as the output voltage level decreases the decreased output voltage is similarly reflected by third inductor 50 with reversed polarity and is passed by second add resistor 90B to pull up the voltage appearing at ZCD thus increasing the off time, thereby decreasing the frequency. Thus, for a fixed output current, the frequency of power factor corrector controller 10 is reduced when less output voltage is required and the frequency of power factor corrector controller 10 is increased when more output voltage is required. Linking capacitor 170 acts to smooth out the voltage waveform appearing at node 175, which represents the sum of VOUTREP and VSUPCLAMP, which is then linked to either reduce the discharge rate of the voltage appearing at input ZCD or increase the discharge rate of the voltage appearing at input ZCD.

In further clarification, the output load is a function of the number of constituent LEDs in LED string 60 and the current there through. The arrangement of FIG. 1 thus provides a highly efficient power source over a broad range of voltage load requirements of LED string 60, by adjusting the off time responsive to the output voltage required by the number of constituent LEDs of LED string 60. Additionally, in one embodiment amplitude modulation dimming is supported by a circuit arranged to adjust the current sense feedback signal, responsive to an incoming dimming signal. The amplitude modulation dimming thus results in a change in the feedback signal thus impacting the on-time.

Figure 2:
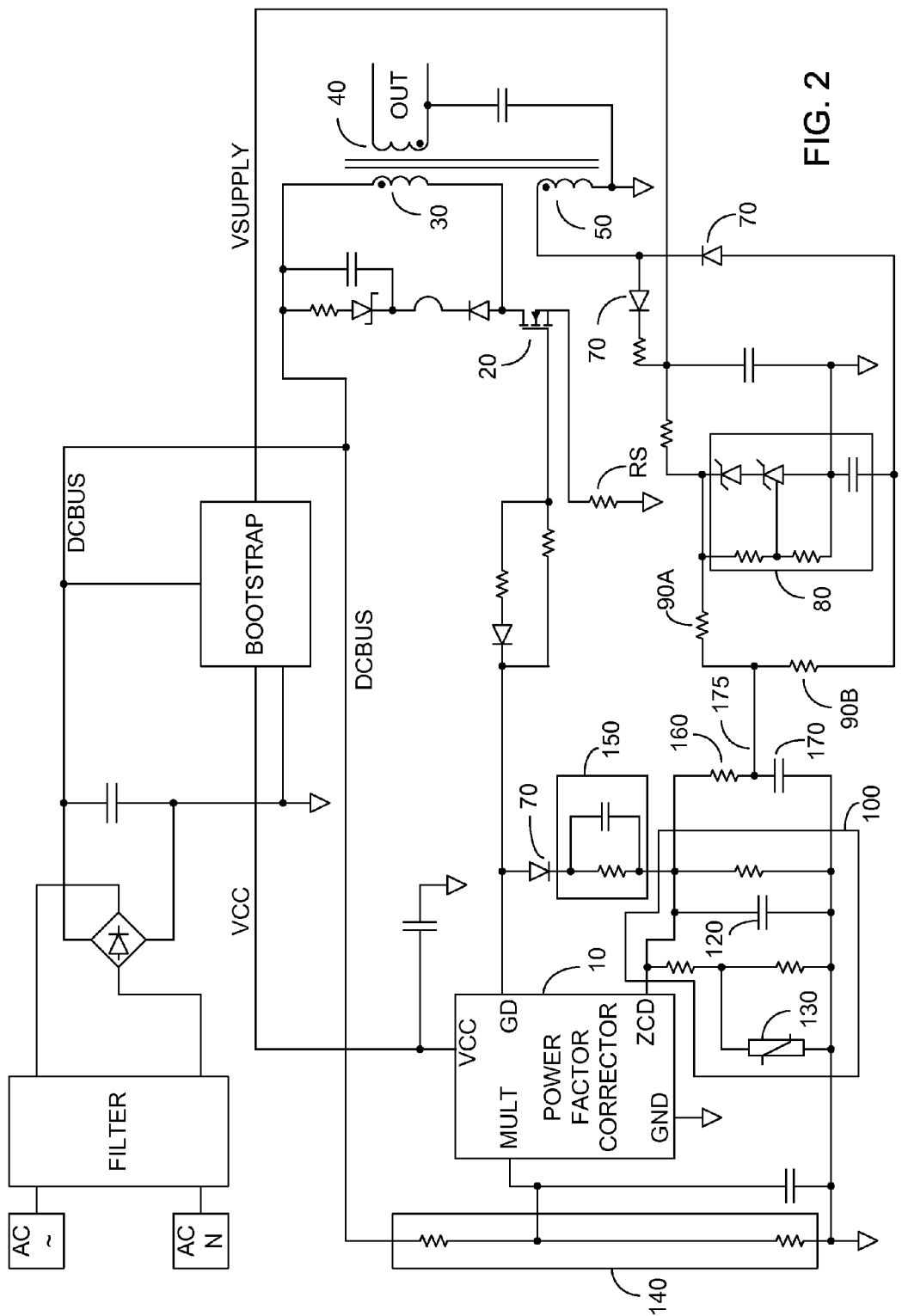
FIG. 2 illustrates a high level schematic diagram of an exemplary embodiment of a power source comprising a power factor corrector controller exhibiting an off-time responsive to both input voltage and output load.

FIG. 2 illustrates a high level schematic diagram of an exemplary embodiment of a power source comprising a power factor corrector controller exhibiting an off-time responsive to both input voltage and output load, wherein certain additional circuit elements are provided in a non-limiting best mode enabling illustration. Additionally, the source of DCBUS is shown, as well as a connection for a bootstrap circuit.

The operation of FIG. 2 is in all respects identical with the operation of FIG. 1, and thus the interest of brevity will not be further detailed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:

1. A power source comprising:
   a source of direct current;
   a power factor corrector controller;
   an electronically controlled switch responsive to said power factor corrector controller;
   a first inductor serially connected with said electronically controlled switch and arranged to pass a direct current from said source of direct current there through when said electronically controlled switch is closed and to not pass the direct current from said source of direct current when said electronically controlled switch is open;
   a second inductor magnetically coupled to said first inductor and coupled to provide power to a load in a flyback arrangement;
   a third inductor magnetically coupled to said first inductor, a first end of said third inductor arranged to provide a representation of the voltage level of said source of direct current when said electronically controlled switch is closed, and to provide a representation of the voltage level of said power provided to the load when said electronically controlled switch is open; and
   an off time control circuit in communication with said power factor corrector controller and with said first end of said third inductor, said off time control circuit arranged to provide an off time to said power factor corrector controller where said electronically controlled switch is open, the provided off time increases responsive to an increase in the representation of the voltage level of said source of direct current provided by said first end of said third inductor and increases responsive to a decrease in the representation of the voltage level of said power provided to the load provided by said first end of said third inductor.

2. The power source according to claim 1, wherein the load is a light emitting diode string.

3. The power source according to claim 1, further comprising a first unidirectional electronic valve, the anode of said first unidirectional electronic valve connected to the first end of said third inductor, and the cathode of said first unidirectional electronic valve coupled to said off time control circuit, said provided representation of the voltage level of said source of direct current responsive to the cathode of said first unidirectional electronic valve.

4. The power source according to claim 3, further comprising a clamping circuit in communication with said cathode of said first unidirectional electronic valve, said clamping circuit arranged to limit the range of responsiveness to the voltage level of said source of direct current.

5. The power source according to claim 4, further comprising a second unidirectional electronic valve, the cathode of said second unidirectional electronic valve connected to the first end of said third inductor, and the anode of said second unidirectional electronic valve coupled to said off time control circuit, said provided representation of the voltage level of said power provided to the load responsive to the anode of said second unidirectional electronic valve.

6. The power source according to claim 3, further comprising a second unidirectional electronic valve, the cathode of said second unidirectional electronic valve connected to the first end of said third inductor, and the anode of said second unidirectional electronic valve coupled to said off time control circuit, said provided representation of the voltage level of said power provided to the load responsive to the anode of said second unidirectional electronic valve.

7. The power source according to claim 1, wherein a second end of said third conductor is connected to a common potential.

8. The power source according to claim 1, wherein said off time control circuit further comprises a thermistor arranged to reduce the off time responsive to an increase in temperature.

9. A method of providing power for a load from a received direct current power, the method comprising:
providing a first inductor;
switchably providing a path for the received direct current through said provided first inductor, wherein said first inductor passes the direct current there through when the path is provided and said first inductor does not pass the direct current there through when said path is not provided;
providing a second inductor magnetically coupled to said provided first inductor, said provided second inductor coupled to provide power to the load in a flyback arrangement;
providing a third inductor magnetically coupled to said provided first inductor, said provided third inductor providing a representation of the voltage level of said received direct current when said path is switchably provided, said provided third inductor providing a representation of the voltage level of the power provided to the load when said path is not switchably provided; and
providing a timing control responsive to the provided third inductor, said switchably provided path responsive to said provided timing control, said provided timing control increasing the amount of time when said path is not switchably provided responsive to an increase in the voltage level of said source of direct current and increasing the amount of time when said path is not switchably provided responsive to a decrease in the voltage level of the power provided to the load.

10. The method of claim 9, further comprising providing a power factor corrector controller, said switchably providing responsive to an output of said power factor corrector controller.

11. The method of claim 9, further comprising providing a first unidirectional electronic valve, the anode of said provided first unidirectional electronic valve connected to a first end of said provided third inductor, and the cathode of said provided first unidirectional electronic valve providing said representation of the voltage level of said source of direct current.

12. The method of claim 11, further comprising limiting the range of responsiveness to the voltage level of said source of direct current.

13. The method of claim 12, further comprising providing a second unidirectional electronic valve, the cathode of said provided second unidirectional electronic valve connected to the first end of said provided third inductor, and the anode of said provided second unidirectional electronic valve providing said representation of the voltage level of the power provided to the load.

14. The method of claim 11, further comprising providing a second unidirectional electronic valve, the cathode of said provided second unidirectional electronic valve connected to the first end of said provided third inductor, and the anode of said provided second unidirectional electronic valve providing said representation of the voltage level of the power provided to the load.

15. The method of claim 11, further comprising connecting a second end of said provided third inductor to a common potential.

16. The method of claim 9, further comprising reducing the amount of time when said path is not switchably provided responsive to an increase in temperature.

17. A power source for solid state lighting comprising:
a means for receiving a direct current;
a power factor corrector controller;
an electronically controlled switch responsive to said power factor corrector controller;
a first inductor serially connected with said electronically controlled switch and arranged to pass a direct current from said means for receiving a direct current there through when said electronically controlled switch is closed and to not pass the direct current from said means for receiving a direct current when said electronically controlled switch is open;
a second inductor magnetically coupled to said first inductor and coupled to provide power to a load in a flyback arrangement;
a third inductor magnetically coupled to said first inductor, a first end of said third inductor arranged to provide a representation of the voltage level of the direct current when said electronically controlled switch is closed, and to provide a representation of the voltage level of said power provided to the load when said electronically controlled switch is open; and
an off time control circuit in communication with said power factor corrector controller and with said first end of said third inductor, said off time control circuit arranged to provide an off time to said power factor corrector controller where said electronically controlled switch is open, the provided off time increases responsive to an increase in the representation of the voltage level of the direct current provided by said first end of said third inductor and increases responsive to a decrease in the representation of the voltage level of said power provided to the load provided by said first end of said third inductor.

18. The power source according to claim 17, further comprising a first unidirectional electronic valve, the anode of said first unidirectional electronic valve connected to said first end of said third inductor, and the cathode of said first unidirectional electronic valve coupled to said off time control circuit, said provided representation of the voltage level of the direct current responsive to the cathode of said first unidirectional electronic valve.

19. The power source according to claim 18, further comprising a clamping circuit in communication with said cathode of said first unidirectional electronic valve, said clamping circuit arranged to limit the range of responsiveness to the voltage level of the direct current.

20. The power source according to claim 19, further comprising a second unidirectional electronic valve, the cathode of said second unidirectional electronic valve connected to the first end of said third inductor, and the anode of said second unidirectional electronic valve coupled to said off time control circuit, said provided representation of the voltage level of said power provided to the load responsive to the anode of said second unidirectional electronic valve.

21. The power source according to claim 18, further comprising a second unidirectional electronic valve, the cathode of said second unidirectional electronic valve connected to the first end of said third inductor, and the anode of said second unidirectional electronic valve coupled to said off time control circuit, said provided representation of the voltage level of said power provided to the load responsive to the anode of said second unidirectional electronic valve.

22. The power source according to claim 17, wherein a second end of said third conductor is connected to a common potential.

23. The power source according to claim 17, wherein said off time control circuit further comprises a thermistor arranged to reduce the off time responsive to an increase in temperature.

\* \* \* \* \*